Oct. 9, 1962 H. E. ROWE 3,057,959

TIMING WAVE GENERATOR

Filed Nov. 2, 1960

INVENTOR
H. E. ROWE
BY [signature]
ATTORNEY 3,057,959
Patented Oct. 9, 1962

3,057,959
TIMING WAVE GENERATOR

Harrison E. Rowe, Little Silver, N.J., assignor to Bell Telephone Laboratories, Incorporated, New York, N.Y., a corporation of New York Filed Nov. 2, 1960, Ser. No. 66,814
16 Claims. (Cl. 178—70)

This invention relates to timing wave generators and, more particularly, to the reduction of spurious phase variations in the output of a timing wave generator for use in regenerative pulse communication systems.

In regenerative pulse communication systems, and notably in pulse code modulation systems, degradation of the signal is reduced to an acceptable value by periodic regeneration of the code pulses as they travel along the system. Such regeneration requires a source of timing waves under the control of which the individual code pulses may be retimed and reshaped. The necessary timing wave must recur at the basic repetition rate of the incoming code pulses which is ordinarily taken as the reciprocal of the minimum period between pulses of such code groups.

The positions in time which the information pulses occupy are called time slots in the communication art. The information then is indicated by the presence or absence, according to the code employed, of pulses in the respective time slots, giving rise to a variable pulse pattern.

It has been a practice in timing wave generators to employ a high Q band-pass filter to derive the required continuous signal or timing wave from an incoming pulse information signal. The formation or production of a timing wave from an intermittent pulse information signal may be conveniently visualized by considering the timing wave as an aggregate of a series of decaying transients superimposed upon each other, each transient being initiated by exciting a parallel resistance-inductance-capacitance circuit (which is a simple band-pass filter) with an individual information pulse, or envelope of a pulse in a radio frequency system. The damped natural frequency of the band-pass filter is, in this case, tuned as closely as possible to the basic repetition rate of the information signal.

It is evident that the ideal timing wave developed from a signal with a constant pulse pattern in which a pulse is present in each time slot is an approximate sine wave of constant amplitude and a frequency equal to that of the repetition rate of the excitation signal. The phase of the timing wave, because it is composed of individual transients each initiated by a respective pulse, is representative of the average phase of the initiating pulses.

In the usual situation where a timing wave is derived from an information pulse signal, however, the time slots are not all filled and the pulse pattern varies with the information being conveyed. During time slots in which there are no pulses present no transients will be initiated in the band-pass filter and the composite timing wave experiences corresponding fluctuations in amplitude. When this timing wave is limited to remove amplitude modulation, the phenomenon of amplitude-to-phase conversion, an inherent characteristic of practical limiters, cause the amplitude fluctuations in the timing wave to manifest themeselves in the limited signal as spurious phase variations. The phase of the timing wave generator output signal, thus, becomes distorted.

The finite pulse width effect discussed in The Bell System Technical Journal, November 1958 issue, at page 1566, variations in phase of a timing wave that arise from tuning error of the band-pass filter, and various other sundry phase variations which develop in a timing wave are also intensified by the changing pulse pattern characteristic of pulse information signals.

These phase variations can be considered as spurious position modulation of the timing wave generator output about its proper time position. For timing wave generators whose outputs are employed to control regenerators used in regenerative repeaters, the spurious position modulation of the timing wave generator output appears as well on the regenerated information signals. As the message pulses undergo successive regeneration in an extended system, the position modulation of the signal pulses accumulates from repeater to repeater, which is a very undesirable effect. If not kept in check, the consequences of such accumulation may be more serious to the system than the effect of noise.

In the past, some of the spurious phase variations caused by changing pulse pattern have been reduced by using extremely high Q band-pass filters to derive timing waves. There is, though, a physical limitation upon the magnitude of Q obtainable. Even if a filter with a sufficiently high Q under the circumstances could be constructed, the slow response of the phase of the timing wave to changes in the phase of the information pulse signal caused by the large time constant resulting from the high Q might be inappropriate for the particular application at hand. Additionally, the effect of tuning error in the band-pass filter is more pronounced with a high Q filter.

It is, therefore, the object of the present invention to reduce spurious phase variations of the output of a timing wave generator and, more particularly, to make the phase of this output independent of pulse pattern variations of the information signals from which the output is derived.

In accordance with the above object, there is provided a logic circuit, and a high Q band-pass filter connected in tandem therewith. Information signals of the pulse variety are passed through the logic circuit into the band-pass filter which is tuned as closely as possible to the basic repetition rate of the pulse information signal. The filter output is then amplified and shaped in order to meet the requirements of the intended use of the timing wave generator, and applied to an output circuit. A feedback path connects the output circuit to the logic circuit. The logic circuit functions to block the passage of the fed-back signal for time slots in which information pulses are present and to pass the fed-back signal to the filter during time slots in which the information pulses are not present. Thus pulses are applied to the band-pass filter during each time slot regardless of the pulse pattern of the information signal, and a timing wave which is not dependent upon the pulse pattern of the information conveyed is derived by the band-pass filter.

Additionally, automatic phase control circuitry compensates for any objectionable phase shifts which are introduced into the feedback loop by the components included in the loop.

The above and other features of the invention will be considered in detail in the following specification taken in connection with the drawing, wherein.

Figure 1:
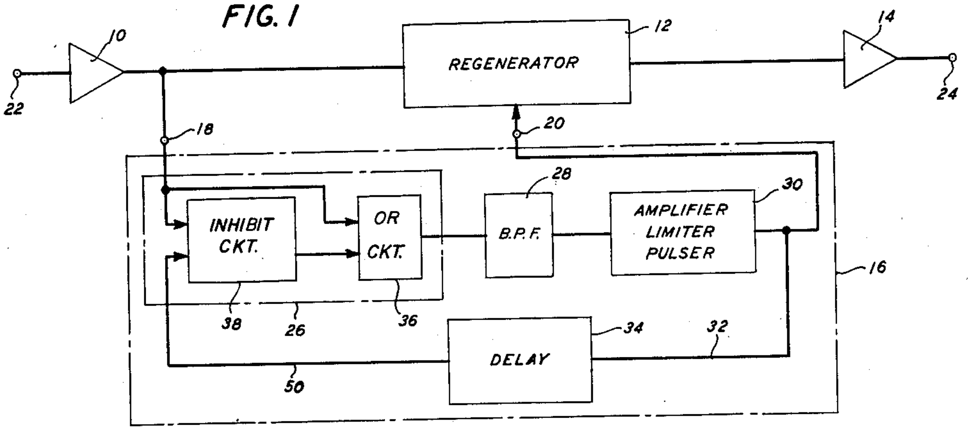
FIG. 1 is a schematic diagram in block form of the timing wave generator of the present invention employed in a regenerative repeater.
Figure 2:
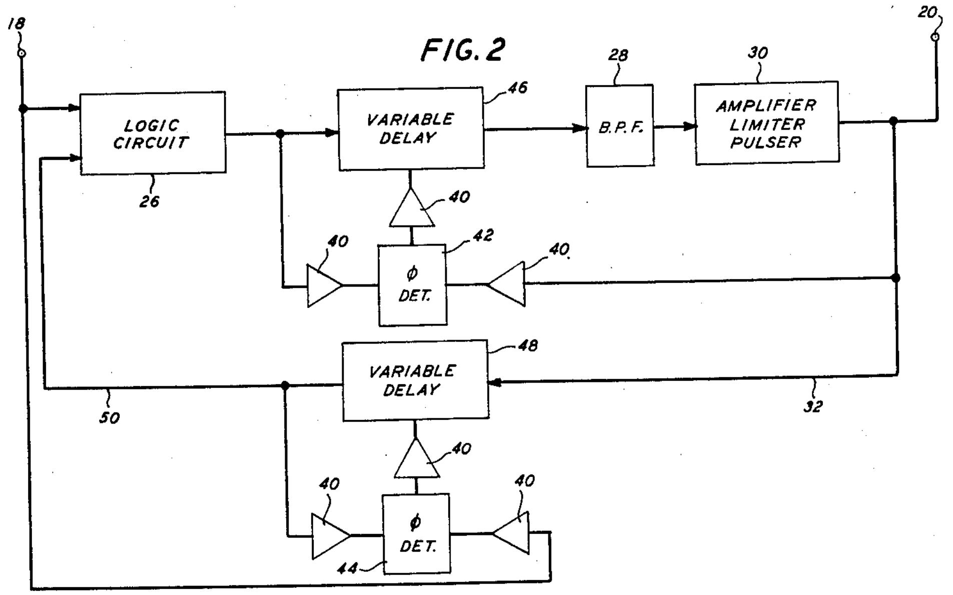
FIG. 2 is a schematic diagram in block form of the timing wave generator of the present invention employing automatic phase control circuitry.

In FIG. 1 of the drawing there is disclosed a regenerative repeater utilizing a timing wave generator 16, which derives timing pulses in accordance with the principles of the present invention from a pulse information signal, and employs these timing pulses to control regeneration of the pulse information signal. The output of a source of pulse information signals, characterized by time slots occurring at a basic repetition rate, the presence or absence of the pulses in their respective time slots denoting the information being conveyed, is accepted by an input terminal 22 of the repeater and applied to an amplifier 10. A portion of the amplified signal is applied to an input terminal 18 of timing wave generator 16 while the remainder of the amplified signal is applied to a regenerator 12. In a radio frequency system an envelope detector would be required to demodulate the portion applied to timing wave generator 16. The timing pulses derived by timing wave generator 16 are applied through an output terminal 20 to control regenerator 12. Thereafter, the regenerated signal is amplified in an amplifier 14 and applied to an output terminal 24 of the repeater.

In timing wave generator 16, a logic circuit 26, a band-pass filter 28, and an amplifier-limiter-pulser 30 are tandemly connected. Band-pass filter 28 is excited into oscillation by the pulses emanating from logic circuit 26, and the resultant timing wave is amplified and shaped in amplifier-limiter-pulser 30 to meet the requirements of regenerator 12.

A parallel resistance-inductance-capacitance circuit may be employed as band-pass filter 28. In this case, the damped natural frequency of band-pass filter 28 is made equal to the basic repetition rate of the pulse information signal. Band-pass filter 28 should be in the underdamped or damped oscillatory condition, as is well known in electric circuit theory and elaborated upon in detail in Chapter 5, Article 5 of Introductory Circuit Theory, Ernest A. Guillemin, John Wiley and Sons, Inc., New York, 1953.

Of course, any more complex frequency selective circuits having a band-pass characteristic might fulfill the requirements of band-pass filter 28.

An alternative means for deriving the timing wave is achieved by the substitution of a phase-locked oscillator as disclosed in Patent 2,502,942 issued April 4, 1950 to W. M. Goodall for band-pass filter 28.

Amplifier-limiter-pulser 30, shown in one block for convenience, comprises an amplifier which provides gain to the output of filter 28, a limiter for removing residual amplitude variations that might be present on the amplified signal, and a pulser for developing properly shaped pulses representative in phase of the phase of the clipped signal. The pulser may, by way of example, be a relaxation type circuit such as a blocking oscillator.

A first portion of the amplified and shaped timing pulse train is applied to output terminal 20 and a second portion of the timing pulse train is applied on feedback lead 32 through a suitable delay 34, which will be discussed in greater detail subsequently, and a feedback lead 50 to logic circuit 26.

The function of logic circuit 26 is to pass the pulse information signal applied through input terminal 18 for time slots in which information pulses are present and, at the same time, to inhibit or block pulses which may be present simultaneously on feedback lead 50. For time slots in which there are no information pulses present on input terminal 18, pulses from feedback lead 50 are, according to the invention, passed through logic circuit 26. Consequently, pulses are continually emanating from logic circuit 26 at a rate substantially equal to the basic repetition of the information signal, regardless of the intermittent character of the pulse information signal applied to input terminal 18.

The required function of logic circuit 26 can be carried out by a conventional inhibit circuit 38 and a conventional OR circuit 36 connected as shown in FIG. 1 of the drawing. If an information pulse is present in some specific time slot on input terminal 18, its presence blocks the passage of a coincident pulse from feedback lead 50 through inhibit circuit 38. At the same time the information pulse traverses OR circuit 36 to band-pass filter 28. On the other hand, if there is no information pulse present in some specific time slot on input terminal 18, a pulse from feedback lead 50 traverses inhibit circuit 38 and OR circuit 36 to band-pass filter 28.

It should be understood that OR circuit 36 is employed primarily for the purpose of isolation. If isolation of the various circuits is not required due to the characteristics of the particular circuits used or isolation is brought about in a different manner, then OR circuit 36 can be eliminated without interfering with or changing the logical function of logic circuit 26 previously described.

The amount of delay introduced by delay 34 is that required to make the pulses on feedback lead 50 coincide in time with the information pulses on input terminal 18, so that the information pulses and not the feedback pulses as much as possible define the phase of the derived timing pulses.

Timing wave generator 16 operates as a simple prior art timing wave generator comprising a band-pass filter and an amplifier-shaper for time slots in which there are information pulses present at input terminal 18. However, during time slots in which no information pulses are present at input terminal 18, the circuit becomes regenerative and thus is analogous to a feedback oscillator.

As a practical matter, the circuit components constituting timing wave generator 16 introduce phase variations, which can adversely affect performance, into the feedback loop. Probably the most series source of phase shift results from slow drifts of band-pass filter 28 away from the frequency to which it was originally tuned. Other phase variations develop from the instability of amplifier-limiter-pulser 30 and delay 34 over long periods of time.

Figure 3:
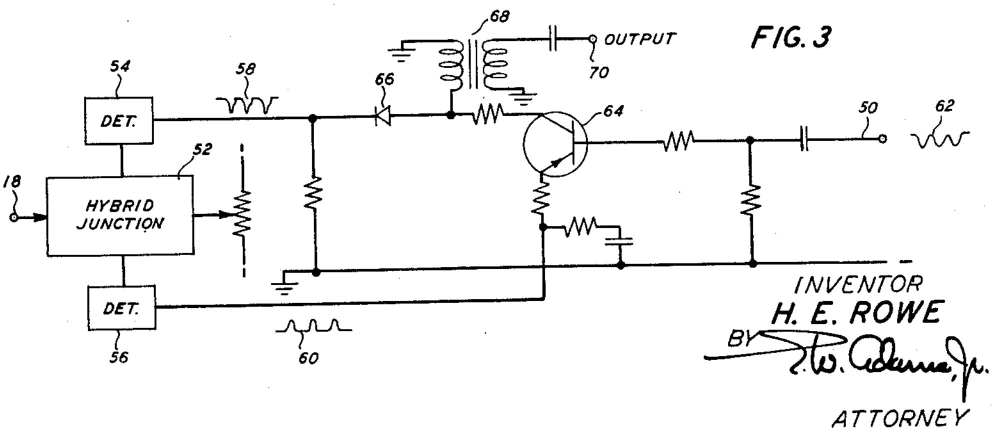
FIG. 3 is a circuit arrangement which performs the logic required by the present invention.

In FIG. 3 automatic phase control circuitry is disclosed which compensates for undesirable phase drifts which may develop. A variable delay 46, placed in the signal path between logic circuit 26 and band-pass filter 28, introduces delay into the feedback loop under the control of an error voltage developed by a comparison of the output of logic circuit 26 and the signal at output terminal 20 in a phase detector 42. Consequently, variable delay 46 nullifies any phase variations that band-pass filter 28 and amplifier-limiter-pulser 30 might otherwise introduce into the timing pulses applied to regenerator 20 or the pulses on feedback lead 32.

To prevent misalignment between the pulses on feedback lead 50 and those at input terminal 18, as for instance caused by aging in fixed delay 34 of FIG. 1, samples of these pulse signals are compared in a phase detector 44 which develops an error voltage to correct the misalignment by controlling a variable delay 48 substituted for fixed delay 34 of FIG. 1.

Amplifiers 40 are inserted in the automatic phase control circuit paths to furnish gain where necessary.

A great deal of freedom may be exercised in providing the automatic phase control. Both or either of the phase control loops may be employed in a particular application and the arrangement of elements can, depending upon the circumstances, be different.

Variable delay devices 46 and 48 each can be, for example, a transmission line terminated in its characteristic impedance. In this case a voltage actuated motor is excited by the output of an amplifier 40 to vary the length of the transmission line and, therefore, the delay introduced by the variable delay device.

Alternatively, a lumped inductance-capacitance ladder network in which the capacitance varies with voltage may be employed as variable delay devices 46 and 48. Here, the output of amplifier 44 controls the capacitance of and consequently the delay introduced by the ladder network. Such a variable delay device is disclosed in Patent 2,883,536 issued April 21, 1959 to J. D. Salibury et al.

The timing wave generator of the present invention operates as a loosely-coupled, phase synchronized oscillator. Stated another way, the output signal is locked to the input signal and follows the slow phase variations of the input signal. The amount of coupling is inversely related to the Q of band-pass filter 28. If extremely weak coupling is desired, a resonant cavity might be advantageously employed as band-pass filter 28 because of the high Q attainable thereby. If, on the other hand, strong coupling is desired, a low Q, lumped parameter, parallel resistance-inductance-capacitance circuit might be used without an increase in the spurious phase variations of the output signal resulting from changing pulse pattern.

A circuit which performs the required function of logic circuit 26 is illustrated in FIG. 3. This circuit is particularly well adapted for use in radio frequency repeaters. In that environment a radio frequency signal is applied through input terminal 18 to a hybrid junction 52. The signal divides in hybrid junction 52 in accordance with the well-known principles which govern its performance, and is applied to envelope detectors 54 and 56. Detectors 54 and 56 reproduce different halves of the radio frequency signal envelope. In this particular circuit detector 54 reproduces the negative half of the envelope as represented by a pulse train 58 and detector 56 the positive half as represented by a pulse train 60. At the same time the signal, represented by a negative pulse train 62, is applied on feedback lead 50 to the base of a transistor 64.

In the absence of pulses in the time slots of pulse trains 58 and 60, the pulses of pulse train 62 pass through transistor 64 and traverse a transformer 68 to an output terminal 70. If, on the other hand, pulses are present in the time slots of pulse trains 58 and 60, the pulses of pulse train 58 pass through diode 66 and traverse transformer 68 to output terminal 70 while the pulses from pulse train 60 applied to the emitter of transistor 64 inhibit the passage of pulses from pulse train 62 through the base of transistor 64 to transformer 68. Thus, pulses are applied to output terminal 70 in every time slot as required.

What is claimed is:

1. A timing wave generator comprising means for developing a timing wave which is representative in phase of pulse signals applied thereto, means for amplifying and shaping said timing wave, a source of intermittent pulse signals, means for coupling said pulse signals to said developing means, and means for coupling a portion of the output of said amplifying and shaping means to said developing means only during intervals of time in which said pulse signal is absent.

2. A timing wave generator comprising means for developing a timing wave which is representative in phase of signals applied thereto, amplifying and shaping means, and utilization means connected in tandem in the order given, a source of intemittent input signals, means for coupling said input signal to said developing means, and means for coupling a portion of the signal applied to said utilization means to said developing means only during intervals of time in which said input signal is absent.

3. A timing wave generator comprising means for developing a timing wave representative in phase of pulse signals applied thereto, amplifying and shaping means, and utilization means connected in tandem in the order given, a source of pulse information signals, the presence or absence of the information pulses in their respective time slots of said pulse information signal being determined by the information conveyed, and logic means for applying a fed-back portion of the signal applied to said utilization means to said developing means when information pulses are absent from their respective time slots and for inhibiting said fed-back portion and applying said pulse information signal to said developing means when information pulses are present in their respective time slots.

4. A timing wave generator comprising a source of pulse code modulated signals, the presence or absence of the pulses in their respective time slots being determined by the information transmitted according to the code, a bandpass filter, means for amplifying and shaping the output of said band-pass filter, and logic means for applying a sample of said amplified and shaped output to said band-pass filter when an information pulse is absent from its time slot and for inhibiting said output sample and applying said pulse code signal when an information pulse is present in its time slot.

5. A timing wave generator comprising logic means having first and second input terminals, pulses on said first input terminal being passed and pulses coincident therewith on said second input terminal being inhibited, pulses on said second input terminal being passed when no pulses are coincident therewith on said first input terminal, a band-pass filter which is tuned to the basic repetition rate of applied pulse information signals, amplifying and shaping means, and utilization means, all connected in tandem in the order given, a source of pulse information signals connected to said first input terminal of said logic means, and means for feeding back a portion of the signal applied to said utilization means to said second input terminal of said logic means.

6. In a timing wave generator, a transmission path comprising a frequency selective element with a band-pass characteristic related to a chosen repetitive characteristic of applied pulse signals, amplifying and shaping means, and utilization means connected in the order given, a source of intermittent input pulse signals, means for coupling said input signal to said frequency selective element, and means for coupling a portion of the signal applied to said utilization means to said frequency selective element only during intervals of time in which said input signal is absent.

7. A timing wave generator comprising means for developing a timing wave which is representative in phase of pulse signals applied thereto, amplifying and shaping means, and utilization means connected in tandem in the order given, a source of intermittent input pulse signals, means for coupling said input signal to said developing means, means for coupling a portion of the signal applied to said utilization means to said developing means only during intervals of time in which said input signal is absent, and automatic phase control means for maintaining phase alignment between said portion and said input signal.

8. In a timing wave generator, a transmission path comprising a frequency selective element having a band-pass characteristic, amplifying and shaping means, and utilization means connected in tandem in the order given, a source of intermittent input pulse signals, means for coupling said input signal to said frequency selective element, means for coupling a portion of the signal from said utilization means to said frequency selective element only during intervals of time in which said input signal is absent, means for delaying said portion an amount sufficient to maintain phase alignment between it and said input signal, a variable delay device connected in tandem with said frequency selective element, means for deriving a control signal indicative of drifts in frequency of said frequency selective element, and means for applying said control signal to said variable delay device.

9. In a timing wave generator, a transmission path comprising a band-pass filter, amplifying and shaping means, and utilization means connected in tandem in the order given, a source of pulse information signals, the presence or absence of the information pulses in their respective time slots of said pulse information signal being determinative of the information being conveyed, logic means for applying a fed-back portion of the signal applied to said utilization means to said band-pass filter when information pulses are absent from their respective time slots and for inhibiting said fed-back portion and applying said pulse information signal to said band-pass filter when information pulses are present in their respective time slots, means for delaying said fed-back portion an amount sufficient to maintain phase lock between it and said pulse information signal, a variable delay device connected in tandem with said band-pas filter, means for deriving a control signal indicative of drifts in frequency of said band-pass filter, and means for applying said control signal to said variable delay device.

10. A timing wave generator comprising a source of pulse code modulated signals, the presence or absence of the pulses in their respective time slots being determinative of the information transmitted according to the code, a band-pass filter which is tuned to the basic repetition rate of said pulse code signal, means for amplifying and shaping the output of said band-pass filter, logic means for applying a sample of said amplified and shaped output to said band-pass filter when an information pulse is absent from its time slot and for inhibiting said output sample and applying said pulse code signal when an information pulse is present in its time slot, and automatic phase control means for compensating for phase shifts introduced by tuning drift of said band-pass filter.

11. In a timing wave generator, a transmission path comprising logic means, a band-pass filter, amplifying and shaping means, and utilization means connected in tandem in the order given, a source of pulse information signals, the presence or absence of the information pulses in their respective time slots of said pulse information signal being determinative of the information being conveyed, means for applying said pulse information signal to said logic means, means for applying a fed-back portion of the signal applied to said utilization means to said logic means, said logic means passing information pulses and inhibiting said fed-back portion when information pulses are present in their respective time slots, said logic means passing said fed-back portion when information pulses are absent from their respective time slots, a variable delay device connected in tandem with said band-pass filter, means for deriving a control signal indicative of phase drifts arising in said transmission path, and means for applying said control signal to said variable delay device.

12. A timing wave generator comprising a source of intermittent input signals, logic means, utilization means, a continuous signal transmission path interconnecting said logic means with said utilization means, means for applying said input signal to said logic means, means for applying a portion of the signal from said utilization means to said logic means, said logic means passing said input signal and inhibiting said portion of said output signal during intervals of time in which said input signal is present, said logic means passing said portion of said output signal during intervals of time in which said input signal is absent, a variable delay device connected in said signal transmission path, means for deriving a control signal indicative of phase drifts occurring in said transmission path, and means for applying said control signal to said variable delay device.

13. A timing wave generator comprising a source of intermittent input signals, logic means, utilization means, a continuous signal transmission path interconnecting said logic means with said utilization means, means for applying said input signal to said logic means, means for applying a portion of the signal from said utilization means to said logic means, said logic means passing said input signal and inhibiting said portion of said output signal during intervals of time in which said input signal is present, said logic means passing said portion of said output signal during intervals of time in which said input signal is absent, and automatic phase control means for maintaining phase alignment between said portion and said input signal.

14. A timing wave generator comprising a source of intermittent input pulse signals, logic means, utilization means, a continuous signal transmission path interconnecting said logic means with said utilization means, means for applying said input signal to said logic means, means for applying a portion of the signal from said utilization means to said logic means, said logic means passing said input signal and inhibiting said portion of said output signal during intervals of time in which said input signal is present, said logic means passing said portion of said output signal during intervals of time in which said input signal is absent, means for delaying said portion an amount sufficient to maintain phase alignment between it and said input signal, a variable delay device connected in said signal transmission path, means for deriving a control signal indicative of phase drifts occurring in said transmission path, and means for applying said control signal to said variable delay device.

15. A regenerative repeater comprising an input terminal, a source of intermittent information signals connected to said input terminal, an output terminal, a signal path connected therebetween, said signal path comprising an amplifier, means for abstracting a portion of the information signal, a signal regenerator operating under the control of an external timing signal, and a second amplifier all connected respectively in tandem, and means for developing said timing signal from said abstracted portion of said information signal to control regeneration, said last-named means comprising a band-pass filter, amplifying and shaping means, and an interconnection to said regenerator connected in tandem in the order given, means for coupling said portion of said information signal to said band-pass filter, and means for coupling a sample of the signal applied to said regenerator to said band-pass filter only during intervals of time in which said information signal is absent.

16. A regenerative repeater comprising an input terminal, a source of intermittent information signals connected to said input terminal, an output terminal, an information signal path connected therebetween, said information signal path comprising an amplifier, means for abstracting a portion of the information signal, a regenerator, and a second amplifier all connected respectively in tandem, and means for developing a timing signal from said abstracted portion of said information signal to control regeneration, said last-named means comprising a band-pass filter, amplifying and shaping means, and a connection to said regenerator connected in tandem in the order given, means for coupling said portion of said information signal to said band-pass filter, means for coupling a sample of the signal applied to said regenerator to said band-pass filter only during intervals of time in which said information signal is absent, and automatic phase control means for maintaining phase lock between said abstracted portion and said timing signal.

References Cited in the file of this patent

UNITED STATES PATENTS

| | | |
|---|---|---|
| 2,617,885 | Cutler | Nov. 11, 1952 |
| 2,842,669 | Six et al. | July 15, 1958 |